United States Patent [19]

Hirsch et al.

[11] Patent Number: 5,765,973
[45] Date of Patent: Jun. 16, 1998

[54] REVERSIBLE CONUNTERSINK

[75] Inventors: Mordechai Hirsch, Nahariya; Beny Avraham, Lod, both of Israel

[73] Assignee: Noga Engineering Ltd., Israel

[21] Appl. No.: 388,442

[22] Filed: Feb. 14, 1995

[30] Foreign Application Priority Data

Feb. 16, 1994 [IL] Israel ......................................... 108659

[51] Int. Cl.⁶ .................................................. B23B 51/00
[52] U.S. Cl. ........................ 408/188; 408/199; 408/227
[58] Field of Search .............................. 408/54, 93, 154, 408/155, 159, 187, 199, 211, 227, 228, 231, 238, 239 R, 188; 7/157

[56] References Cited

U.S. PATENT DOCUMENTS

| 92,195 | 7/1869 | Kelly | 408/159 |
| 265,272 | 10/1882 | Moeslein | 408/159 |
| 1,392,960 | 10/1921 | Mizzell | 408/159 |
| 2,438,558 | 3/1948 | Hollander | 408/154 |
| 2,448,385 | 8/1948 | Michela | 408/199 |
| 2,590,053 | 3/1952 | Taylor | 408/188 |
| 3,170,224 | 2/1965 | Johnson | 408/188 |
| 5,135,338 | 8/1992 | Heule | 408/187 |
| 5,597,273 | 1/1997 | Hirsch | 408/227 |

FOREIGN PATENT DOCUMENTS

| 650246 | 8/1937 | Germany | 408/187 |
| 2237647 | 2/1974 | Germany | 408/211 |

*Primary Examiner*—Daniel W. Howell
*Attorney, Agent, or Firm*—Baker & Botts, L.L.P.

[57] ABSTRACT

A deburring tool having an insert having four cutting edges such that the tool will cut in either direction of rotation is disclosed. The insert is pivotably mounted on a handle.

4 Claims, 4 Drawing Sheets

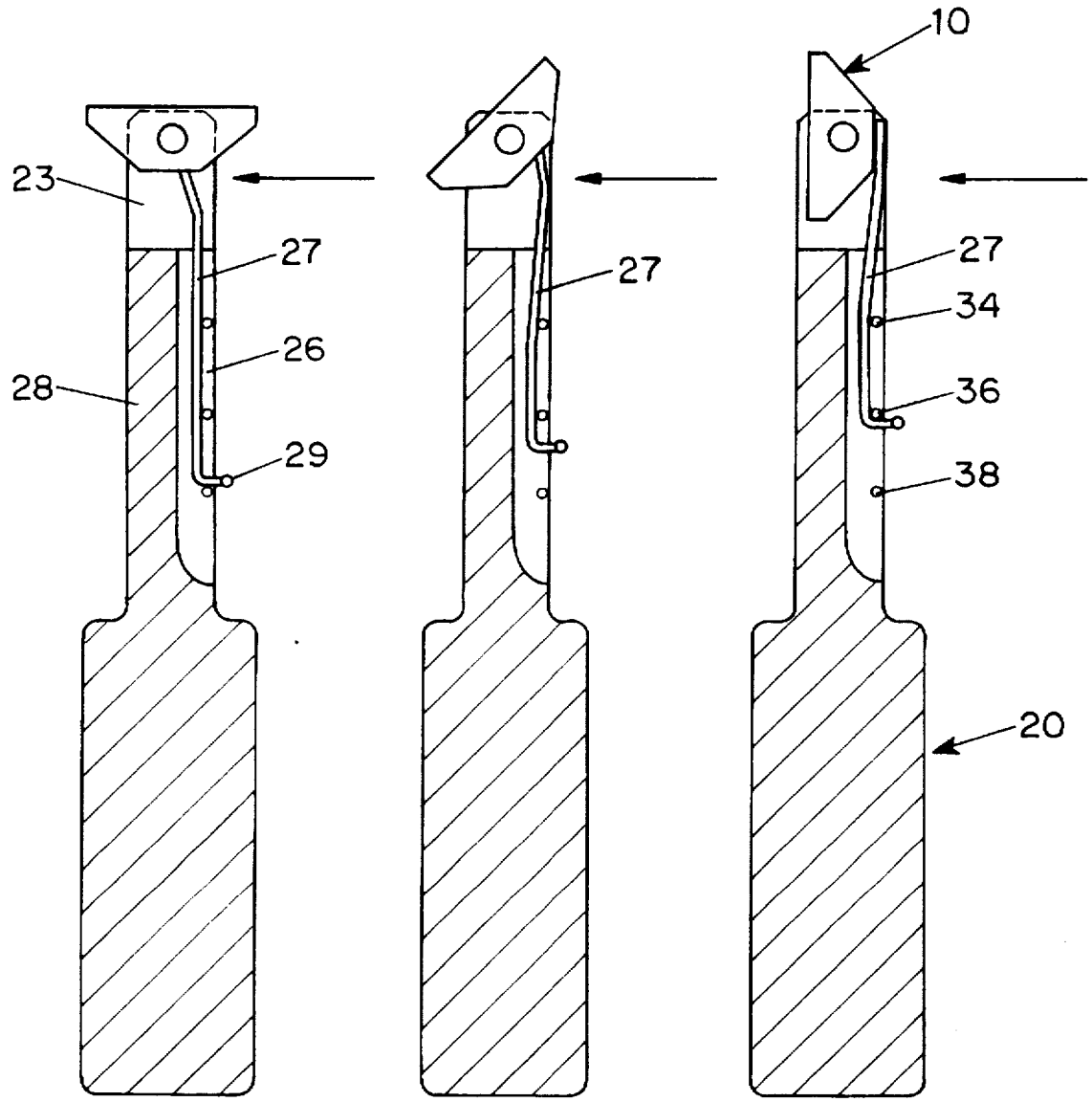

though not necessarily.

REVERSIBLE COUNTERSINK

BACKGROUND OF THE INVENTION

The invention relates to a novel countersink. More particularly, the invention concerns a countersink with reversible chamfering means.

Countersinks are most commonly used in order to enlarge the outer end of a hole or cavity, in order to receive the head of a screw.

Another common use of countersinks, is to remove burrs formed on the rims of holes, while the hole is being formed by drilling or by other known means. Rims of holes formed in metal plates are easily accessible from both sides of the hole by known countersinks, which are substantially of conical shape with several cutting edges extending along the concial surface, having a releif angle therewith. However, deburring of holes drilled in tubular parts can be effected by known conical countersinks, only on the outer rim of the hole, while the internal edge of the hole is inaccessible. Furthermore, hand operated known conical countersinks can cut while rotating in one direction only, which is a major disadvantage, since the operator has to move his wrist back and forth in order to accomplish the deburring by hand, thus the backward movement in known countersinks, does not contribute to the deburring.

It is the object of the present invention to provide for a countersink adapted to smoothen ragged edges and remove burrs formed in holes in tubular parts and other inaccessible sides.

It is a further object of the invention to provide for a hand countersink adapted to remove burrs from holes formed by drilling by both forward and backward circular motion of the tool.

BRIEF DESCRIPTION OF THE INVENTION

In accordance with the invention there is provided a hand operated countersink comprising:

(a) a substantially flat cutting insert provided with a central transverse hole;

(b) a shaft provided with a longitudinal slot at one end thereof, the width of said slot being slightly larger that the width of said cutting insert; and (c) cylindrical support means for said cutting insert fixedly attached to the end of the shaft transversal to said slot, allowing rotation of said cutting insert within the slot of said shaft to assume various positions of said blades relative to the position of said shaft.

Preferably, the cutting insert is substantially of isosceles triangular shape, optionally truncated, having four cutting edges substantially along the two ends of the two equal sides of the triangle.

Thus, the rotation of the cutting insert within the shaft enables blades of the countersink of the invention to assume various positions allowing deburring of both external and internal rims of drilled holes.

The position of the cutting insert may be adjusted by the hands of the operator. However, when the interior of the hole is inaccessible by the operator the position of the cutting insert may be adjusted by means associated with the countersink exterior to the hole being deburred.

BRIEF DESCRIPTION OF THE DRAWINGS

The invention is illustrated by way of example with reference to the accompanying drawings in which:

FIGS. 5a, 5b, and 5c are cross-sectional views of another tool according to the invention with cutting insert shown at three different positions.

DETAILED DESCRIPTION OF THE INVENTION

Figure 1:
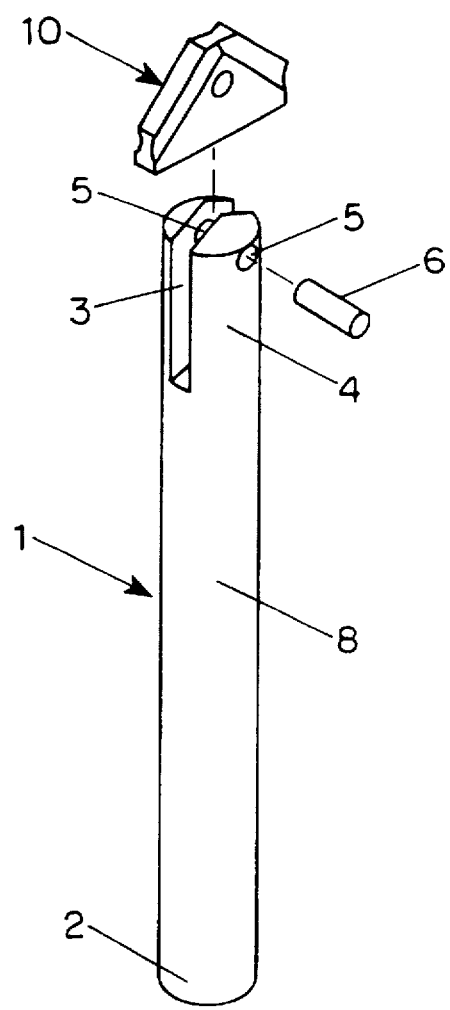
FIG. 1 is an exploded perspective view of the tool according to the invention.

Countersink 1 shown in FIG. 1 comprises a cylindrical shaft 8, end 2 of said shaft is capable of being inserted and fixed into a drill chuck, or into a handle by know fixing means. Longitudinal slot 3 located at the center of the other end of the shaft is of constant width forming two equal end parts 4, each provided with circular transverse holes 5, facing each other.

Cylindrical pin 6 having a length substantially equal to the diameter of shaft 8 and a diameter slightly smaller then the diameter of holes 5.

Figure 3:
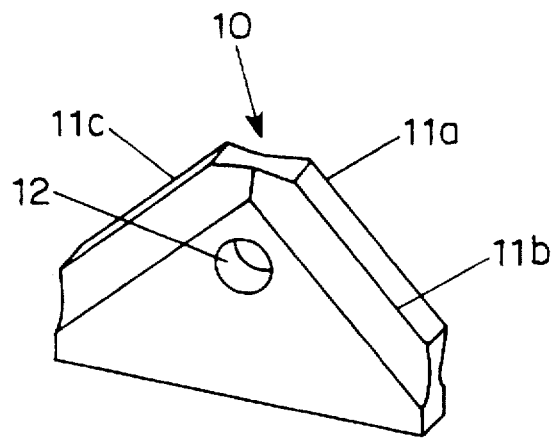
FIG. 3 is another perspective view of the cutting insert shown in FIGS. 1 and 2.

Flat cutting insert 10, shown in more detail in FIG. 3, is substantially of isosceles triangular shape and has altogether four cutting edges 11 (three shown in figure), along the two ends of the two equal sides of the triangle. Transverse circular hole 12 runs through the center of cutting insert 10, having a diameter slightly larger than the diameter of pin 6.

Tool 1 may be assemble by its producer as follows: cutting insert 10 is placed in slot 3, so that the center of its transverse hole 12 is along a straight line with the centers of two holes 5 of shaft 8. Cylindrical pin 6 is then pushed into the three holes and press fitted into the shaft 8.

In assembled countersink 1, cutting insert 10 can freely rotate on pin 6, which serves as fulcrum.

Assembled countersink 1 when fixed into handle 14 serves as a manual countersink 20 for removing ragged edges in drilled holes.

Figure 2:
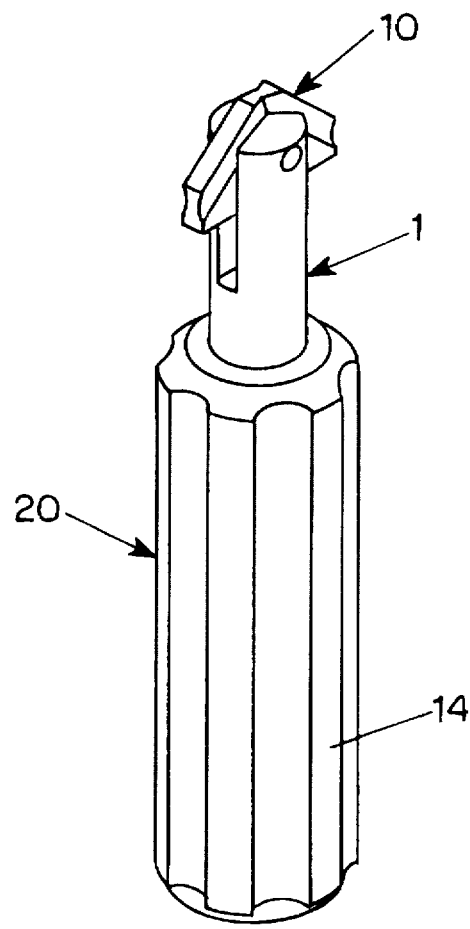
FIG. 2 is a perspective view of a hand tool according to the invention.
Figures 4A, 4B, 4C:
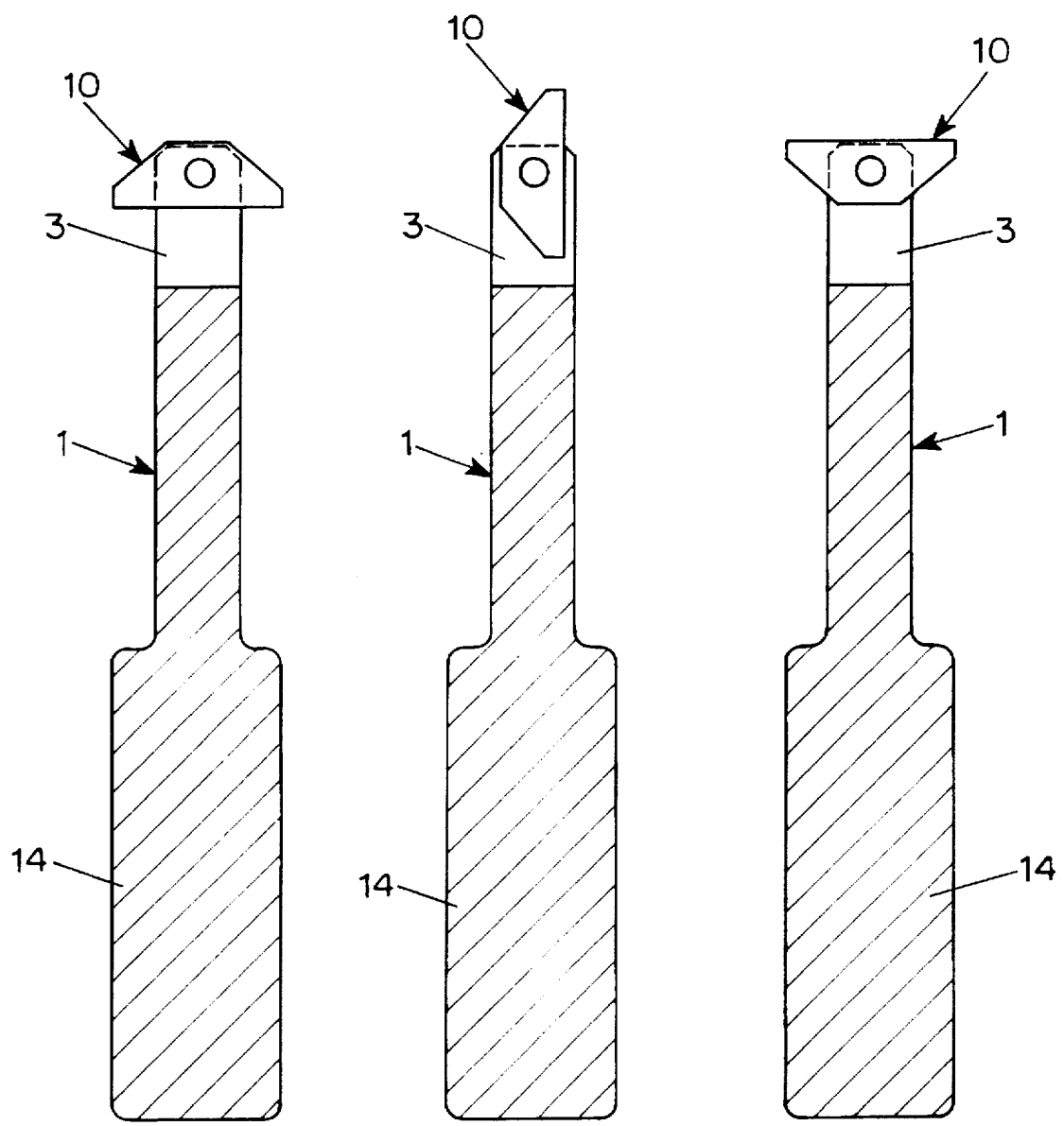
FIGS. 4a, 4b, and 4c are cross-sectional views of three different positions of the cutting insert in the tool shown in FIG. 2.

The position of cutting insert 10 in tool 20, as shown in FIG. 2 and FIG. 4a, is adapted to deburr ragged edges in the outer rim of a hole, facing the operator, while the position as shown in FIG. 4c, wherein the cutting inserted is rotated by 180°, is adapted to deburr the inner rim of a hole, in particular, holes drilled in tubular parts. In order to introduce the cutting insert into the hole so that its blades 11 are adjacent to the inner rim of the hole, as shown in FIG. 4c, cutting insert 10 is swiveled by 90° and shaft 8 together with cutting insert 10 are introduced through the hole in position shown in FIG. 4c. Cutting insert 10 is then swivelled into position c and pulled towards the operator, so that cutting edges 11 are adjacent to the inner rim of the hole. The operator can now rotate the handle a few times back and forth about half a turn, or slightly more, while pulling the tool outwardly, against the inner rim of the hole, so that the cutting edges are pressed against the inner rim of the hole and the burrs are removed by the back and forth rotation of the countersink.

After the deburring operation has been completed, cutting insert 10 is swiveled to position b and the tool is removed from the part being deburred.

Due to the structure of cutting insert 10, wherein four cutting edges are available for the deburring operation cutting edges 11b and 11d for the clockwise rotation and blades 11a and 11c for the counterclockwise rotation much effort is saved on behalf of the operator. Thus deburring takes place both in the clockwise and counterclockwise rotation, thereby also utilizing the counterclockwise rotation for the deburring operation.

When the position of the hole to be deburred is such that the area of the inner rim of the hole is inaccessible by the fingers of the operator, the rotation of cutting insert 10 from position b to position c cannot be effected and therefore the tool must be provided with means allowing the swivelling of the cutter, which are external to the part being chamfered.

Figure 6A:
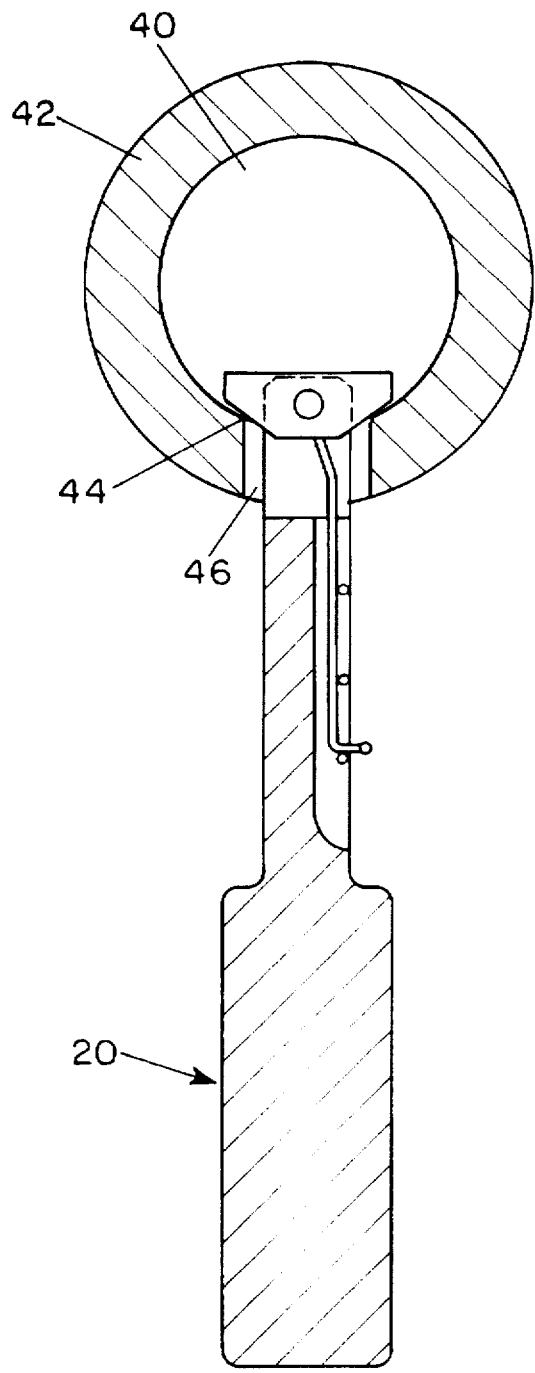
FIGS. 6a and 6b are cross sectional views of the tool shown in FIGS. 5a, 5b, and 5c in relation to a hole being chamfered.
Figure 6B:
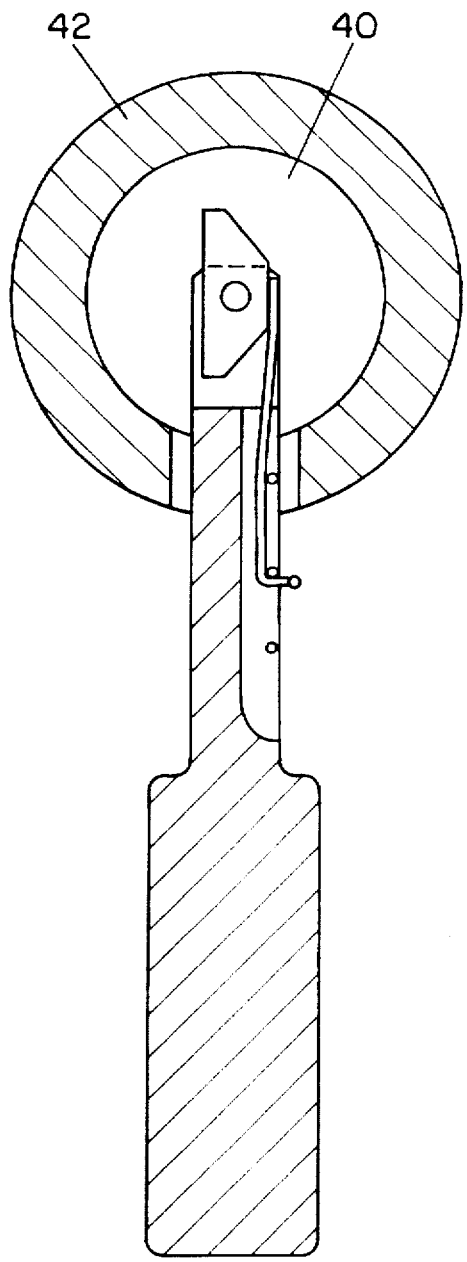

Such means are exemplified in hand operated countersink 20, shown in FIGS. 5 and 6. The external means shown in figures are in the form of a bent wire 27, located in a longitudinal slot 26, running along shaft 28, parallel to upper slot 23. The dimensions of slot 25 are to allow free longitudinal motion for bent wire 27, which controls the position of cutting insert 10, as is to be explained below.

Bent wire 27 is provided with a knob 29 extending out of shaft 28. Three small pins 34, 36 and 38, fixedly attached to shaft 28 along the rims of slot 26, guide and limit the movement of bent wire 27, within slot 26.

The upper end of bent wire 27 is spring biased in the direction shown by arrows in FIG. 5. Pins 35 and 38 serve as stoppage to the longitudinal motion of bent wire 27 within slot 26, not allowing downward motion beyond pin 38 as depicted in position (d) said upward motion beyond pin 36 as depicted in position (f). Pins 34 and 36 guide bent wire 27, so that it will slide within slot 26.

When bent wire 27 is in its uppermost position (position (f)), cutting insert 10 has been swivelled to its longitudinal position allowing its insertion into cross hole 40 of tubular part 42, as shown in FIG. 6. Subsequently, knob 29 is pulled down to its lowermost position—position d—and the handle is pulled outwardly, so that blades 11 of cutting insert 10 are pressed against inner rims 44 of hole 46. Rotation of handle back and forth will debur ragged edges from rim 44.

When the deburring is completed the tool is pushed backward into cross hole 40 and knob 29 is slid up to its upper most position—position (f)—to allow the removal of countersink 20 from tubular part 42.

We claim:

1. A hand-operated countersink adapted for the deburring of inner and outer rims of holes comprising:

(a) a substantially flat symmetrical cutting insert provided with a central transverse hole wherein the cutting insert is substantially of isosceles triangular shape, said insert having four cutting edges substantially along the two ends of the two equal sides of the triangle, wherein the height of said triangle is substantially equal to the diameter of the shaft holding said cutting insert;

(b) a shaft provided with a longitudinal slot at one end thereof the width of said slot being slightly larger than the width of said cutting insert; and (c) cylindrical support means for said cutting insert fixedly attached to the end of the shaft transversal to said slot allowing rotation of said shaft to assume various positions of said blade relative to said shaft.

2. A hand operated countersink according to claim 1 wherein the cutting insert is truncated.

3. A countersink according to claim 1 wherein the shaft of said countersink is fixedly held in a handle.

4. A countersink according to claim 1 for the deburring of the inner rims of drilled holes in metal parts, further comprising means for controlling the rotation of the cutting insert, said means being associated with the shaft, and connecting between the cutting insert and some point along the shaft.

* * * * *